United States Patent
Chen

(10) Patent No.: US 10,396,586 B1
(45) Date of Patent: Aug. 27, 2019

(54) WIRELESS CHARGING AND POWERING OF ELECTRONIC DEVICES BY MULTIPURPOSE WIRELESS TRANSMITTING DEVICES

(71) Applicant: Marcellus Chen, Fremont, CA (US)

(72) Inventor: Marcellus Chen, Fremont, CA (US)

(*) Notice: Subject to any disclaimer, the term of this patent is extended or adjusted under 35 U.S.C. 154(b) by 149 days.

(21) Appl. No.: 15/709,829

(22) Filed: Sep. 20, 2017

Related U.S. Application Data

(60) Provisional application No. 62/397,492, filed on Sep. 21, 2016.

(51) Int. Cl.
| | |
|---|---|
| *H02J 7/00* | (2006.01) |
| *H02J 7/02* | (2016.01) |
| *H02J 50/20* | (2016.01) |
| *H04B 5/00* | (2006.01) |
| *H02J 50/80* | (2016.01) |

(52) U.S. Cl.
CPC .......... *H02J 7/025* (2013.01); *H02J 50/20* (2016.02); *H02J 50/80* (2016.02); *H04B 5/0037* (2013.01)

(58) Field of Classification Search
CPC .................................................. H02J 7/025
USPC ........................................................ 320/108
See application file for complete search history.

(56) References Cited

U.S. PATENT DOCUMENTS

| | | | |
|---|---|---|---|
| 6,169,339 B1* | 1/2001 | Cripe | B60R 21/017 280/735 |
| 7,400,253 B2* | 7/2008 | Cohen | G06K 19/0707 235/383 |
| 7,521,890 B2* | 4/2009 | Lee | H02J 5/005 320/108 |
| 8,416,721 B1 | 4/2013 | Chen | |
| 8,781,434 B2 | 7/2014 | Chen | |
| 2006/0113955 A1* | 6/2006 | Nunally | H02J 7/025 320/108 |
| 2008/0150364 A1* | 6/2008 | Chen | H02J 1/10 307/65 |
| 2008/0197804 A1* | 8/2008 | Onishi | H02J 7/025 320/108 |

* cited by examiner

*Primary Examiner* — Yalkew Fantu
(74) *Attorney, Agent, or Firm* — Kim & Stewart LLP

(57) ABSTRACT

An electronic device includes a first antenna for transmitting a signal to a remote communication node and a second antenna for receiving a RF power signal from a remote wireless charger. The device includes a RF to DC converter connected to second antenna to convert the RF power signal to direct current power. DC power management circuitry is connected to the RF to DC converter to supply the direct current power to at least one of a battery or a device circuit. The electronic device includes a controller that monitors an output level of the transmission signal being transmitted to the remote communication node, determines whether the output level has met a predetermined threshold level during a transmission cycle, and causes the second antenna to be turned off after the output level has met or exceeded the predetermined threshold level during a predetermined number of transmission cycles.

20 Claims, 4 Drawing Sheets

WIRELESS CHARGING AND POWERING OF ELECTRONIC DEVICES BY MULTIPURPOSE WIRELESS TRANSMITTING DEVICES

CROSS-REFERENCE TO RELATED APPLICATION

This application claims priority to U.S. provisional application having Ser. No. 62/397,492, filed on Sep. 21, 2016, which is hereby incorporated by reference in its entirety.

BACKGROUND

Field

This disclosure relates generally to wireless charging and powering of wireless devices by radio frequency signals and multipurpose wireless signal transmitting devices for charging and powering wireless devices.

Description of Related Art

In general, wireless radio frequency (RF) transmissions associated with wireless communication via cellphones, tablets, personal computers, servers, and the like waste large amounts of energy. For mobile wireless communication devices that mostly operate on battery power, this waste can manifest as a reduction in battery charge lifetime. Battery charge lifetime is often considered a key characteristic used to differentiate mobile wireless products in a competitive marketplace. Consumers generally prefer devices having longer battery charge lifetimes that require fewer user-initiated charging events. Therefore, devices and/or systems that increase apparent battery charge lifetimes (or the time between user-initiated recharging events) would be desirable. More broadly, improvements in power efficiency for any electronic device, mobile or fixed, are also generally desirable, and devices and/or systems which reduce energy waste are likewise generally desirable.

Certain electronic devices have been developed to incorporate a wireless charging or powering function in which an RF signal can be received by an antenna of the electronic device and this energy (provided by the RF signal) is then used, for example, to charge a battery or operate components in the electronic device. Some such devices have been previously disclosed in U.S. Pat. Nos. 8,416,721 and 8,781,434, the entire contents of which are incorporated herein by reference.

SUMMARY OF DISCLOSURE

According to one embodiment, an electronic device comprises a first antenna for transmitting a transmission signal to a remote communication node and a second antenna for receiving a radio frequency power signal from a remote wireless charger. The electronic device includes a RF to DC converter connected to second antenna and configured to convert the radio frequency power signal to direct current (DC) power. DC power management circuitry is connected to the RF to DC converter. The DC power management circuitry is configured to supply the direct current power to at least one of a battery or a device circuit of the electronic device. A controller in the electronic device is configured to monitor an output level of the transmission signal being transmitted to the remote communication node, determine whether the output level has met or exceeded a predetermined threshold level during a transmission cycle, and cause the second antenna to be turned off after the output level has met or exceeded the predetermined threshold level during a first predetermined number of transmission cycles. In some examples, the second antenna can also receive a portion of the transmission signal and this portion can also be supplied to the RF to DC converter.

According to another embodiment, a wireless charger for providing a radio frequency (RF) power signal to an electronic device comprises a radio frequency power signal transmitter for outputting a radio frequency power signal, a network interface for connecting to a remote data server, and a processor configured to request power state information from an electronicdevice and to transmit the power state information to the remote data server for storage. Power state information may include a battery charge level of the electronic device.

According to still another embodiment, a method of operating a data server connected to a wireless charger comprises receiving, via a network interface, power state information of an electronic device connected to a wireless charger; storing the power state information of the electronic device, the power state information including a battery charge level of the electronic device; and serving a targeted advertisement to the at least one of the electronic device and the wireless charger at a time when the power state information indicates the battery charge level of the electronic device is below a threshold level of charge.

In some examples of the various embodiments, the electronic device may be a wireless communication device, such as a cellular phone, mobile computer, tablet computer, personal digital assistant, or the like. In some examples, the electronic device may also or instead have non-wireless communication functions. Likewise, the electronic device in some examples may be any battery-operable electronic device whether having communications-related functions or not.

BRIEF DESCRIPTION OF THE DRAWINGS

So that the manner in which the above recited features of the present disclosure can be understood in detail, a more particular description of the embodiments, briefly summarized above, may be had by reference to example embodiments provided herein, some of which are illustrated in the appended drawings. It is to be noted, however, that the appended drawings illustrate only example embodiments and are therefore not to be considered limiting of the scope of this disclosure, for the invention may admit to other equally effective embodiments than those specifically depicted in the drawings.

For clarity, identical reference numbers have been used, where applicable, to designate substantially identical elements that are used in common between figures. It is contemplated that features of any one embodiment may be incorporated in or combined with the other disclosed embodiments without further recitation of the incorporation or combination.

DETAILED DESCRIPTION

Figure 1:
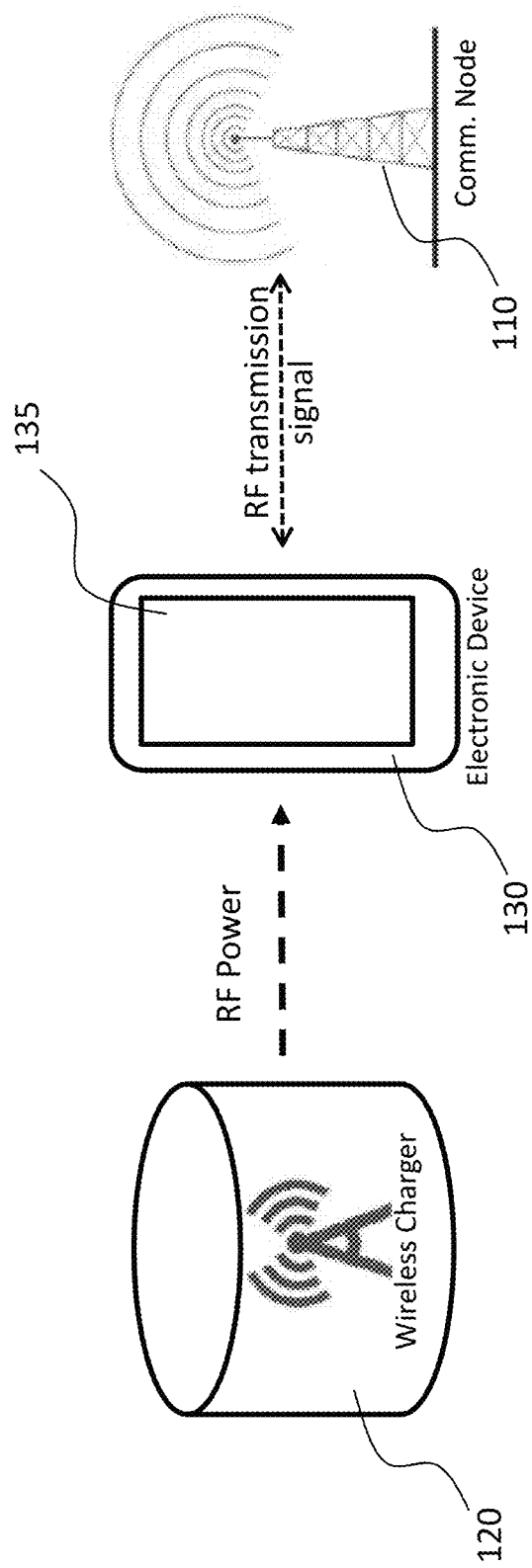
FIG. 1 illustrates a wireless communication system including a wireless charger.

FIG. 1 depicts a wireless communication system including a wireless communication device 130 (also referred to as "device 130" or "electronic device 130"). The wireless communication system also includes a wireless communication node 110 (also referred to as "node 110") and a wireless charger 120 (also referred to as "charger 120"). An RF transmission signal is used to provide communication between the node 110 and the device 130. The device 130 incorporates RF power harvesting technology (described further below) according to an embodiment of the present disclosure. The charger 120 provides an RF power broadcast from which the device 130 harvests power to charge an internal battery (see, e.g. FIG. 3) and/or supplement the power from internal battery. That is, RF power supplied by wireless charger 120 can be used to a) re-charge a battery of device 130, b) operate/power device 130, or c) a combination of both powering and re-charging device 130. The wireless communication device 130 in this example embodiment includes a display screen 135.

In one example, the wireless communication system can be a cellular network in which the wireless communication node 110 is a cell tower or the like. In such a case, the wireless communication device 130 might be a cellphone or other apparatus having telephonic communication ability, such as an electronic tablet device, laptop computer, a personal digital assistant, or the like. In general, in this example, the device 130 and the node 110 can transmit and/or receive information to/from each other via a RF transmission signal for purposes of communication whether via voice or data transfer.

In other embodiments, the wireless communication system might be a wireless local area network (WLAN) or other wireless communication network types, including peer-to-peer wireless networks. Thus, in some examples, the wireless communication node 110 can be a cell tower, a network base station, a wireless access point device, a communications satellite, or the like.

In some examples, wireless charger device 120 may be a single-purpose, dedicated wireless (RF) power charger. In other examples, wireless charger device 120 may be a multipurpose device providing other functions in addition to an RF power broadcasting function to be used for remote RF power charging. For example, the wireless charger device 120 may be, or may be incorporated within, a smart television, a networked home appliance, a home networking device, a home automation device, or home assistant device. In this context, a "home assistant device" includes devices having functions such as voice-initiated Internet searching, home automation interfacing, media playing, personal shopping assistance, or the like, whether or not such home assistant devices are deployed in a home or commercial setting. Thus, in some examples, the wireless charger device 120 may additionally have WiFi routing functions, a capability to perform voice-initiated searching via Internet-based search engines, media player functions, user-initiated shopping functions, or other various functions. In some examples, the wireless charger device 120 and the wireless communication device 130 may be able to communicate with each other via wireless methods (e.g., WiFi, BlueTooth®, etc.).

In some embodiments, the wireless charger device 120 may be connected to a central server that has been established or configured to gather, store, analyze, and/or distribute information received or produced by the wireless charger device 120 or a plurality of wireless charger devices 120. The wireless charger device 120 may also gather store, analyze, and/or distribute information to and from the wireless communication device(s) 130 that interact with the wireless charger device 120. The wireless charger device 120 may also be configured to communicate with remote data servers for the purposes of gathering, storing, and/or distributing information concerning wireless communication devices 130.

The wireless charger device 120, in general, may output RF power signals at any frequency considered appropriate to its operating environment. For example, the RF power signal may be in the 1 GHz to 2 GHz range. The RF power signal from wireless charge device 120 may be varied in output frequency, intensity, and direction according to the operating environment and/or known, anticipated, estimated, measured, or intended distances between wireless charger device 120 and one or more wireless communication device 130 to be powered or charged by charger 120.

The RF power signal from wireless charger device 120 may be output in an omnidirectional manner or may be directed or focused in certain directions from wireless charger device 120. The direction(s) of output for the RF power signal may be varied according to an evaluation of the operating environment of wireless charger device 120. Such an evaluation may occur prior to installation or may be conducted periodically and/or dynamically during operation by wireless charger device 120.

Receivable energy in the RF power signal dissipates with distance from charger 120, but it is not necessary for device 130 to be placed in direct contact with any portion of charger 120 and effective charging distances of from zero to several meters can be achieved. For example, the wireless charger device 120 may have an effective charging radius of 0 to 10 meters depending on output signal frequency and intensity (amplitude). In some examples, the wireless charger device 120 may supply about 1 Watt of power at 15 ft (~46 meters).

In some examples, the wireless communication device 130 may be a cellphone, a smartphone, a tablet device, a personal computer, a server, or other electronic devices incorporating computer functions and/or wireless communication functions.

The device 130 includes an antenna for receiving an RF signal ("RF Power") from the wireless charger device 120. In this example, the antenna is a dedicated antenna provided in device 130 for receiving ("harvesting") power via an RF signal or signals, such as provided by a wireless charger 120, for example.

Figure 2:
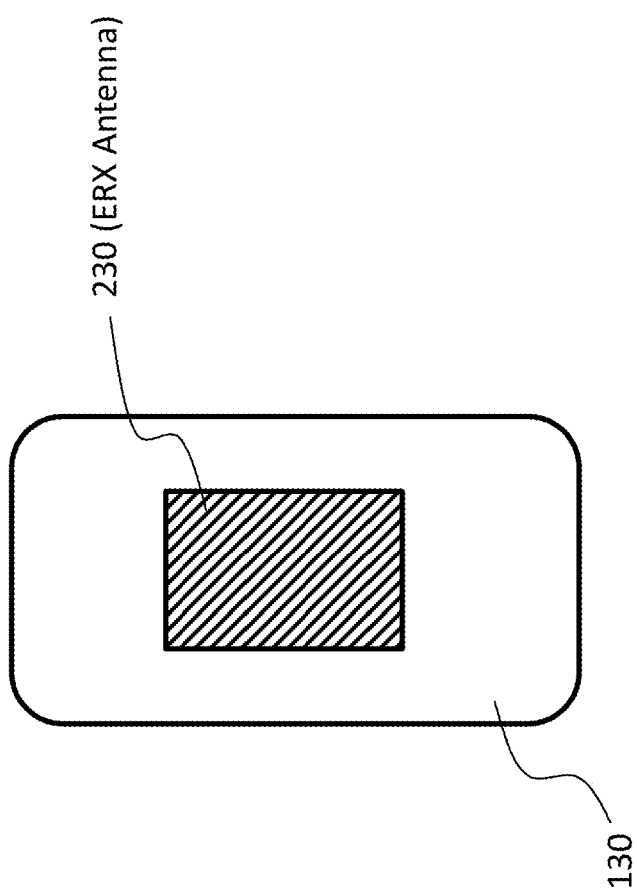
FIG. 2 depicts electronic device incorporating an antenna for RF energy harvesting according to an embodiment.

FIG. 2 depicts a battery-powered electronic device 130 incorporating an antenna 230 for RF energy harvesting according to an embodiment. In a particular example, the device 130 is a wireless communication device (e.g., a smartphone). In general, the antenna 230 is not otherwise used in the transmission and reception of RF signals for the purposes of wireless communication. Transmission/reception of RF communication signals may be handled by a different antenna (not specifically depicted in FIG. 2) of device 130. Antenna 230 may be referred to in some contexts as an energy receiver (ERX) antenna 230. In general, antenna 230 may be disposed anywhere in or on device 130, though typically a position (or positions) less likely to block or impair wireless communications signals between device 130 and other devices (e.g., wireless communication node 110) is preferable when the electronic device 130 is a wireless communication device.

FIG. 2 depicts antenna 230 as disposed on a backside surface of the outer case of device 130, but the position of antenna 230 is not limited to such a position and may be in another position such as within device 130, such as embedded in an internal component of the device 130. While antenna 230 is depicted in FIG. 2 as a unitary element, this is not necessarily required and antenna 230 may be provided as a plurality of portions in some instances. Likewise, the specific position(s) of antenna 230 (or its portions and sub-portions) in or on device 130 may be varied arbitrarily. Antenna 230 placement will generally take into consideration such things as space restrictions and its position relative to other antennas (e.g., antennas for transmission and/or reception of wireless communication signals) in the device 130.

In addition to receiving RF power from a wireless charger 120, the antenna 230 in wireless communication device 120 may also be adapted for and used for harvesting/recycling wireless communications signals output from wireless communication device 130 itself. That is, in some embodiments, antenna 230 can absorb some portion of a wireless signal being output from device 130 for the purposes of RF communication, since for the most part, any portion of RF communication signals output from device 130 that is not being directed generally towards a communication node 110 represents wasted energy.

A situation might arise in which the RF communication functions of device 130 might be negatively affected by the operation(s) to recycle a portion of the RF signal being output or the harvesting of RF power being broadcast by wireless charger 120. In such cases, device 130 may perform one or more of the following operations: a) Send request to wireless charger 120 to turn off (e.g., cease RF power broadcast); b) turn off antenna(s) 230; c) make the decision to turn off wireless charger 120 and/or antenna(s) 230 after a predetermined number of RF transmission cycles have been performed in sequence at a maximum transmission power (or at or above some preset threshold transmission power level); and/or d) Turn on the wireless charger 120 and/or antenna(s) 230 after previously turning off, if RF transmission still requires transmission at the maximum transmission power (or at or above the preset threshold transmission power level).

Figure 3:
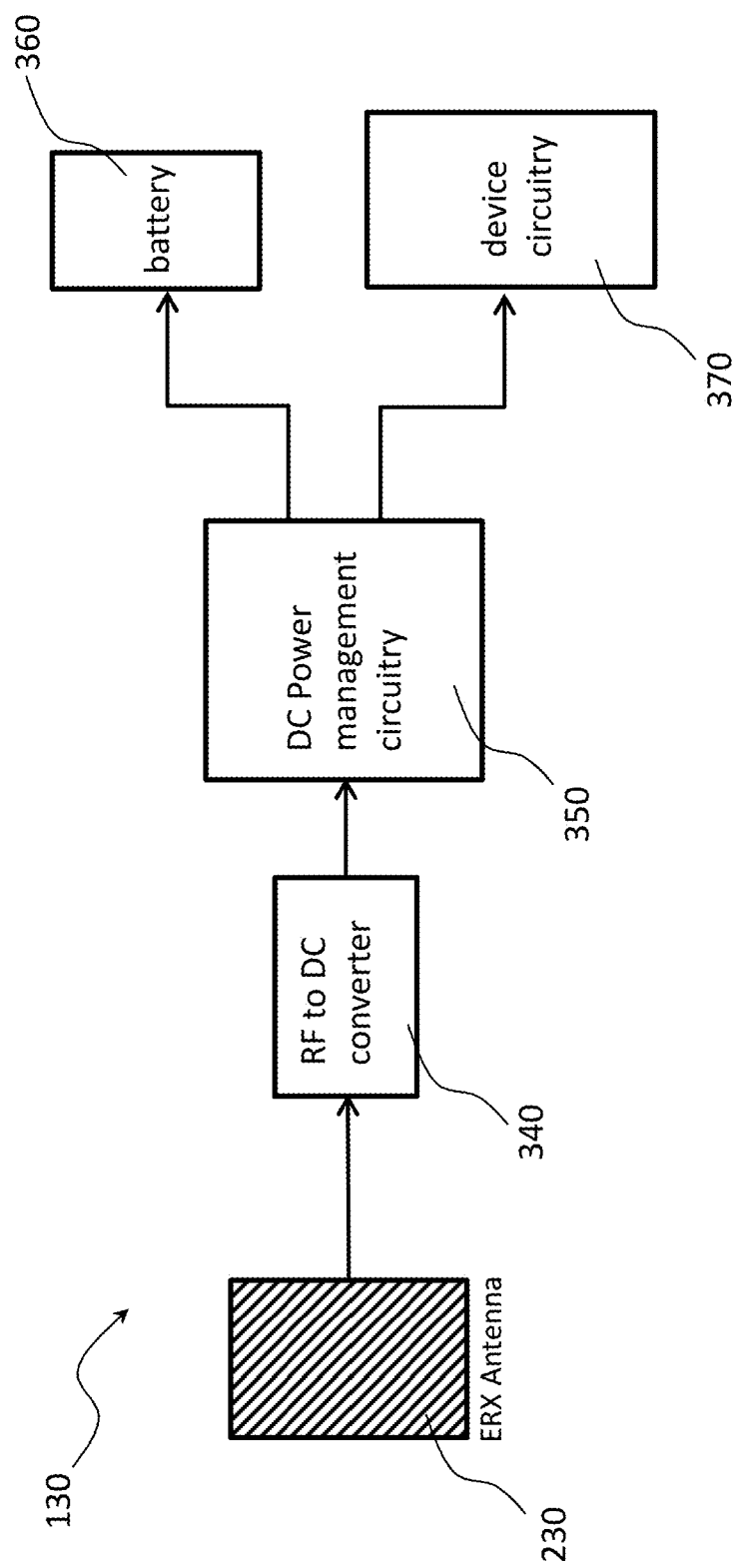
FIG. 3 is a schematic block diagram of a wireless communication device incorporating extra antenna for RF energy harvesting according to an embodiment.

FIG. 3 is a schematic block diagram of an electronic device 130 incorporating an antenna ("ERX antenna") 230 for RF energy harvesting according to an embodiment. FIG. 3 shows that antenna 230 is connected to RF to DC converter 340. The RF to DC converter 340 is connected to DC power management circuitry 350. DC power management circuitry 350 is connected to battery 360 and device circuitry 370.

In general, antenna 230 may receive any available RF signals, whether such signals are being output from another antenna (not specifically depicted) within device 130 or from an external device, such as wireless charger 120.

The antenna 230 may be specifically designed to optimally harvest power from either wireless charger 120 or the transmissions from device 130 itself. In some examples, antenna 230 may specifically designed to optimally harvest energy from the combination of charger 120 and transmissions from device 130. Also, as noted above, one or more antenna 230 may be included in device 130 and/or antenna 230 may be provided in a plurality of portions. As such, one antenna 230 (or one portion of antenna 230) may be adapted to harvest power from one particular source (e.g., wireless charger 120) and another antenna 230 (or another portion of antenna 230) may be adapted to harvest power output from device 130 itself.

RF to DC converter 340 provides direct current power from the alternating, time variant RF signal power source received at antenna(s) 230. The direct current power from RF to DC converter 340 can be supplied to DC power management circuitry 350. DC power management circuitry can route the direct current power to battery 360 and/or to device circuitry 370.

In this particular example, device circuitry 370 is cellphone circuitry providing functions related to cellphone operations, in particular smartphone operations, such as calling, memory storage, touchscreen display, media playing, etc. In other examples, device circuitry 370 may be the circuits and/or components related to the functions of any electronic device such as a tablet computer, a mobile device, a laptop computer, a personal computing device, a remote server, or any battery operable electronic device.

In this particular example, battery 360 is a lithium ion type battery, but battery 360 is not limited to this example and, in general, may be any apparatus which can be used to store energy for later use by device 130.

As noted above, a situation might arise in which normal RF transmit functions of device 130 might be negatively affected by the concurrent operation(s) to harvest the RF transmit power and/or the power being broadcast by the wireless charger 120. In such cases, portions of the DC power management circuitry 350 and/or device circuitry 370 may separately or jointly control various functions and operations of device 130 to: request wireless charger 120 be turned off, turn off antenna(s) 230, and turn wireless charger 120 and/or antenna(s) 230 back on when it is determined harvesting operations are not detrimental to normal RF communication processes.

As noted above, in some embodiments, the wireless charger device 120 can be a single-purpose, dedicated wireless charging device for broadcasting an RF power signal intended to be received by a device 130. In other embodiments, the wireless charger device 120 can have multiple functions and purposes in addition to the wireless charging function.

Figure 4:
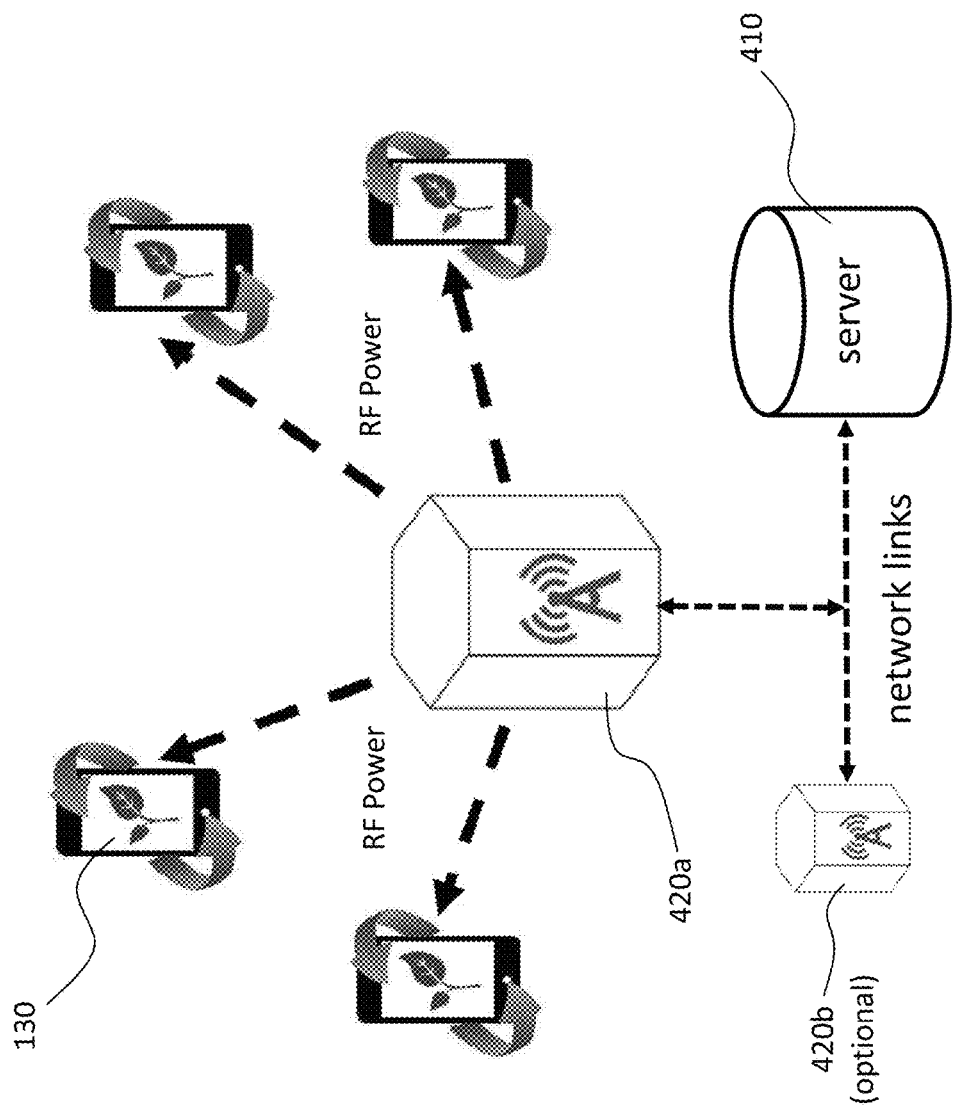
FIG. 4 illustrates a wireless charger device according to an embodiment.

FIG. 4 depicts a particular example of a multipurpose wireless charger device 420a. As depicted, wireless charger device 420a is a multipurpose device providing an RF power broadcasting function ("RF Power") and various other functions. For example, the wireless charger device 420a may be, or may be incorporated within, a smart television, a networking device, a home automation device, or a home assistant device. The wireless charger device 420a may have WiFi routing functions (or other networking functions), a capability to perform voice-initiated searching via Internet-based search engines, media player functions, user-initiated shopping functions, or other functions. In some examples, the wireless charger device 420a and the device(s) 130 may be able to communicate with each other via wireless methods (e.g., WiFi, BlueTooth®, etc.).

In some examples, wireless charger device 420a may be connected to a central server 410 via a communication network ("network links"). Central server 410 may optionally be connected to other multipurpose wireless charge device(s) 420b via the communication network. Sever 410 can be established or configured to gather, store, analyze, and/or distribute information received by, or produced by, wireless charger device 420a and wireless charger device 420b (or a plurality of wireless charger devices 420).

The wireless charger device 420a may also gather store, analyze, and/or distribute information to and from electronic device(s) 130 with which it interacts. The wireless charger device 420a may also be configured to communicate with data server 410 for the purposes of gathering, storing, and/or distributing information concerning particular devices 130 with wireless charger device 420a has interacted.

In a particular example, at least one wireless communication device 130 is a cellphone incorporating RF power harvesting technology described in at least one of U.S. Pat. Nos. 8,416,721 and 8,781,434 for harvesting and reusing their own wasted RF transmit power to increase battery life. Likewise, these electronic devices 130 can also be wirelessly charged without being tethered to a power cord or a charging base of an inductor based wireless charger.

Wireless charger devices (e.g., wireless charger 420a) can be deployed in homes, offices, restaurants, gyms, airports, etc. Individual features and functions of the multipurpose wireless chargers can be disabled and/or tailored for a specific deployment location. For example, when the wireless charger device 420a is deployed in a commercial setting such as an office setting, audio search, media playing, and shopping functions could be disabled individually or in combination. The internal software of wireless charger 420a can be used to display or generate a targeted advertisement on a display screen integrated with, attached to, or functionally connected to the wireless charger 420a (e.g., an integrated display screen or external display screen) in conjunction with a low battery charge state notice and/or when charging from a particular electronic device 130. In such instances of displaying an advertisement, the advertisement may be provided directly from internal memory storage of device wireless charger 420a or from a remote ad server or the like.

User Device Side Additional Implementation

An electronic device 130 useable with wireless charger 420a is as described above in conjunction with FIGS. 1, 2, and 3. Additionally, a device 130 can include software and hardware for requesting that the wireless charging function of wireless charger 420a (or a charger 120) be turned on. Wireless charger 420a, in general, may adapted to be turned off by default to reduce power consumption. The request to turn on may be sent via BlueTooth®, WiFi, or other means including manual operation of a user of device 130.

Battery-operable electronic device 130 can be configured to automatically request charging (e.g., turn on wireless charger 420a RF power broadcasting) if a charge level of battery 360 falls below a certain threshold level or an algorithm operating in device 130 determines the charge level of battery 360 will fall below a certain threshold without additional charging. The device 130 can request charging (e.g., RF power broadcasting from wireless charger 420a) even if the charge level of battery 360 is nominally full, for example, if it is calculated that the RF power broadcast from wireless charger 420a is sufficient to provide operating power to device 130 so as to limit or eliminate the necessity of drawing down power from battery 360. This can keep battery 360 fully charged until the device 130 leaves the effective charging radius of charger 420a. A user of a device 130 may also manually force wireless charger 420a to turn on or off as desired. Device 130 can monitor power usage information, such as time of day and/or days of the week for which battery 360 is statistically more likely to be low on charge, so as to provide a battery level usage profile. Device 130 may then request charging (e.g., turn on RF power broadcast from wireless charger 420a, if available) and/or display a prompt to the user to charge battery 360 prior to the calculated (e.g., statistically expected) time of low power/charge.

The device 130 may include software that monitors a user's power usage information to establish or anticipate times of day and/or days of the week at which the device 130 is statistically likely to be low on power. The software may then cause device 130 to request charging by a nearby wireless charger 420a and/or display a prompt (e.g., on display screen 135) to the user to charge the device before a calculated (or otherwise anticipated) time of low battery charge state. The internal software of device 130 can be used to display a targeted advertisement on the display screen 135 in conjunction with a low battery charge state notice and/or when charging from a nearby wireless charge 420a has been requested or is occurring. In such instances of displaying a targeted advertisement, the advertisement may be provided directly from internal memory storage of device 130 or from a remote ad server or the like.

Server Side Additional Implementation

A data server or servers (e.g., server 410) can be established to gather, store, analyze, and distribute the physical location of particular RF wireless chargers (e.g., 420a and 420b) along with particular mobile electronic device(s) 130 power usage profiles (e.g., user statistics regarding battery usage, time of day/week battery charge levels associated with a particular device 130). This collection and distribution of information via centralized server(s) can facilitate operations (and variations thereof) of the following: The server 410 or device 130 can recommend a physical location at which the device 130 can be wirelessly charged via a known wireless charger device (e.g., charger 420a or 420b). Furthermore, commercial locations such restaurants, gyms, etc. that are hosting a wireless charger device can pay to have their location recommended to device 130 users. Such a recommendation can optionally include additional information such as how much time might be needed to fully charge the device 130.

Additionally, this collection and distribution of information via centralized server(s) can facilitate operations (and variations thereof) of following: Groups of device 130 users will likely tend to congregate in the same home, office, restaurant, etc. The server 410 can then recommend an available charging location based on information from other members of a group of device 130 users, even if this location might otherwise be unknown to some particular members of the same group of users.

Additionally, this collection and distribution of information via centralized server(s) can facilitate operations (and variations thereof) of following: If a particular device 130 is very frequently low on power (e.g., battery 360 is in a low charged state), then a server 410, a multiple purpose unit (e.g., wireless charger 420a) and/or a device 130 (e.g., a cellphone) can display an advertisement (a targeted advertisement) for a specific brand of device 130 having a higher battery capacity and/or longer battery life, or advertisement for a specific brand of external battery pack or a specific brand of RF wireless charger.

In this context, such an advertisement can be a search advertisement, and/or any text, pictorial, audio, video display. This advertisement may serves to enhance or promote brand loyalty for certain brands of devices 130 or chargers 120 or chargers 420 as the case may be. Based on a known/stored usage profile of a particular user's device 130 battery state levels, such an advertisement can display an expected battery life improvement that would be provided by the recommended product versus the currently used device 130. For maximum advertisement effectiveness, the advertisement can be displayed when the device 130 is operating at low power or other such time when the user is mostly likely to be influenced by a recommendation. Particular device 130 (or charger device 120/420) manufacturers can pay to advertise their devices at such times as the advertisement is mostly likely to be effective (e.g., during device 130 low power states).

In some instances it may occur that a particular charging location is at full capacity since each particular RF wireless charger may only effectively charge some maximum total number of devices 130 before the RF power broadcast from the charger (e.g., wireless charger 420a) loses effectiveness. In such instances, the server (e.g., server 410) can recommend to a user of a device 130 the next closest location where a wireless charger (e.g., wireless charger 420b) that has yet to reach its maximum number of devices 130 can be found.

In general, by gathering, storing, analyzing and distributing information for each wireless charger in a network (whether formal or ad hoc network) along with each device 130 (e.g., a cell phone) which interacts with the wireless charger(s), there will be many variations for increasing charging efficiency and effectiveness, advertising opportunities, etc. which are apparent from the stored information.

While the foregoing is directed to embodiments of the present invention, other and further embodiments of the invention may be devised without departing from the basic scope thereof.

What is claimed is:

1. An electronic device, comprising:
   a first antenna for transmitting a transmission signal to a remote communication node;
   a second antenna for receiving a radio frequency power signal from a remote wireless charger;
   a RF to DC converter connected to second antenna and configured to convert the radio frequency power signal to direct current power;
   DC power management circuitry connected to the RF to DC converter and configured to supply the direct current power to at least one of a battery or a device circuit of the electronic device; and
   a controller configured to:
      monitor an output level of the transmission signal being transmitted to the remote communication node,
      determine whether the output level has met or exceeded a predetermined threshold level during a transmission cycle, and
      cause the second antenna to be turned off after the output level has met or exceeded the predetermined threshold level during a first predetermined number of transmission cycles.

2. The electronic device according to claim 1, wherein the controller is further configured to cause a signal to be transmitted to the remote wireless charger to cause the remote wireless charger to cease transmitting the radio frequency power signal.

3. The electronic device according to claim 1, wherein the controller is further configured to monitor a charge state of the battery and cause a signal to be transmitted to the remote wireless charger to cause the remote wireless charger to begin transmitting the radio frequency power signal when the charge state of the battery reaches a predetermined charge level.

4. The electronic device according to claim 1, wherein the second antenna is on an outer case of the electronic device.

5. The electronic device according to claim 1, wherein the controller is further configured to cause the second antenna to be turned on after being turned off when the output level of the transmission signal remains at or above the predetermined threshold level for a second predetermined number of transmission cycles.

6. The electronic device according to claim 1, further comprising:
   a display screen, wherein
   the controller is further configured to:
      monitor a charge state of the battery and cause a signal to be transmitted to the remote wireless charger to cause the remote wireless charger to transmit a targeted advertisement when the charge state of the battery reaches a predetermined charge level, and
      display, on the display screen, the targeted advertisement received from the remote wireless charger.

7. The electronic device according to claim 1, further comprising:
   a display screen, wherein
   the controller is further configured to:
      monitor a charge state of the battery and cause a signal to be transmitted to a remote data server to cause the remote data server to transmit a targeted advertisement when the charge state of the battery reaches a predetermined charge level, and
      display, on the display screen, the targeted advertisement received from the remote data server.

8. A wireless charger for providing a radio frequency power signal to an electronic device, the wireless charger comprising:
   a radio frequency power signal transmitter for outputting a radio frequency power signal;
   a network interface for connecting to a remote data server; and
   a processor configured to request power state information from an electronic device and to transmit the power state information to the remote data server for storage.

9. The wireless charger of claim 8, wherein the power state information includes a battery charge level of the electronic device.

10. The wireless charger of claim 9, wherein the processor is configured to request the data server to transmit a targeted advertisement to be displayed on the electronic device when the battery charge level is below a threshold level of charge.

11. The wireless charger of claim 9, wherein the processor is configured to receive a targeted advertisement to be displayed on the electronic device, the targeted advertisement being supplied by the data server when the battery charge level is below a threshold level of charge.

12. The wireless charger of claim 8, wherein the power state information includes a battery usage profile indicating a battery charge level of the electronic device over time.

13. The wireless charger of claim 12, wherein the processor is configured to request a targeted advertisement from the data server and to cause the target advertisement to be displayed on the electronic device at a time the battery charge level is anticipated by the processor to be below a threshold level of charge, the time being selected by the processor in accordance with the battery usage profile.

14. The wireless charger of claim 12, wherein the processor is configured to transmit the power state information to the data server, to receive a target advertisement from the data server, and to cause the targeted advertisement to be displayed on the electronic device at a time the battery charge level is anticipated by the processor to be below a threshold level of charge, the time being selected by the data server in accordance with the battery usage profile.

15. The wireless charger of claim 8, wherein
the power state information includes a battery charge level of the electronic device, and
the processor is configured to cause a targeted advertisement to be displayed by the electronic device when the battery charge level is below a threshold level of charge.

16. A method of operating a data server connected to a wireless charger, comprising:
receiving, via a network interface, power state information of an electronic device communicating with a wireless charger;
storing the power state information of the electronic device, the power state information including a battery charge level of the electronic device; and
serving a targeted advertisement to the at least one of the electronic device and the wireless charger at a time when the power state information indicates the battery charge level of the electronic device is below a threshold level of charge.

17. The method of claim 16, wherein the time is calculated according to a battery usage profile indicating battery charge level of the electronic device over time and the battery usage profile is established in accordance with previously stored power state information of the electronic device.

18. The method of claim 17, further comprising:
receiving, via the network interface, power state information of a plurality of electronic devices communicating with the wireless charger, wherein
the battery usage profile is established in accordance with power state information for the plurality of electronic devices.

19. The method of claim 16, wherein the targeted advertisement is served to the electronic device to be displayed on a display screen of the electronic device.

20. The method of claim 16, wherein the targeted advertisement is served to the wireless charger.

\* \* \* \* \*